(12) United States Patent
Po (10) Patent No.: US 7,437,041 B2
(45) Date of Patent: Oct. 14, 2008

(54) RING CORE FIBER

(76) Inventor: Hong Po, 8 Towne Lyne Rd., Sherborn, MA (US) 01770

(*) Notice: Subject to any disclaimer, the term of this patent is extended or adjusted under 35 U.S.C. 154(b) by 0 days.

(21) Appl. No.: 11/746,032

(22) Filed: May 8, 2007

(65) Prior Publication Data

US 2007/0206900 A1 Sep. 6, 2007

Related U.S. Application Data

(63) Continuation of application No. 10/675,350, filed on Sep. 30, 2003, now Pat. No. 7,215,858, which is a continuation-in-part of application No. PCT/US02/09513, filed on Mar. 27, 2002.

(60) Provisional application No. 60/280,033, filed on Mar. 30, 2001.

(51) Int. Cl.
*G02B 6/00* (2006.01)

(52) U.S. Cl. ...................................... 385/123

(58) Field of Classification Search ........................ None
See application file for complete search history.

(56) References Cited

U.S. PATENT DOCUMENTS

| | | | |
|---|---|---|---|
| 4,725,110 A | 2/1988 | Glenn |
| 4,815,079 A | 3/1989 | Snitzer |
| 5,027,079 A | 6/1991 | Desurvire |
| 5,058,976 A | 10/1991 | DiGiovanni |
| 5,077,087 A | 12/1991 | Byer |
| 5,106,176 A | 4/1992 | Poumellec |
| 5,121,460 A | 6/1992 | Tumminelli |
| 5,125,066 A | 6/1992 | Ishiguro |
| 5,225,925 A | 7/1993 | Grubb |
| 5,259,046 A | 11/1993 | DiGiovanni |
| 5,278,850 A | 1/1994 | Ainslie |
| 5,367,588 A | 11/1994 | Hill |
| 5,412,672 A | 5/1995 | Ainslie |
| 5,422,897 A | 6/1995 | Wyatt |

(Continued)

FOREIGN PATENT DOCUMENTS

EP 0881511 A2 12/1998

(Continued)

OTHER PUBLICATIONS

Ghatak et al.; "Design of Waveguide Refractive Index Profile to Obtain Flat Modal Field"; SPIE vol. 3666, pp. 40-44 (1998).

(Continued)

*Primary Examiner*—Sung H Pak
(74) *Attorney, Agent, or Firm*—Peter J. Rainville (57) ABSTRACT

An optical waveguide can include a first region (12), a core (14) and a cladding (16). The core (14) surrounds the first region (12), and the cladding (16) surrounds the core (14). Typically, the core (14) includes an active material. In a further aspect, the invention features a system that includes two fibers (10, 48). One of the fibers has a first region, a first core (e.g., a multimode core) surrounding the first region, and a cladding surrounding the core. The other fiber has a core (e.g., a single mode core). The fibers can optically communicate so that energy can propagate from one of the cores to the other of the cores of the two fibers. Typically, at least one of the cores includes an active material.

42 Claims, 7 Drawing Sheets

U.S. PATENT DOCUMENTS

| | | | |
|---|---|---|---|
| 5,530,709 A | 6/1996 | Waarts | |
| 5,666,372 A | 9/1997 | Ball | |
| 5,774,484 A | 6/1998 | Wyatt | |
| 5,877,890 A | 3/1999 | Snitzer | |
| 5,881,197 A | 3/1999 | Dong | |
| 6,018,533 A * | 1/2000 | Krivoshlykov | 372/6 |
| 6,043,930 A | 3/2000 | Inagaki | |
| 6,081,369 A | 6/2000 | Waarts | |
| 6,097,512 A | 8/2000 | Ainslie | |
| 6,192,179 B1 | 2/2001 | Berkey | |
| 6,288,835 B1 | 9/2001 | Nilsson | |
| 6,434,302 B1 * | 8/2002 | Fidric et al. | 385/43 |
| 6,445,494 B1 | 9/2002 | Nilsson | |
| 6,496,301 B1 | 12/2002 | Koplow | |
| 6,538,807 B2 | 3/2003 | Kakui | |
| 6,650,663 B1 | 11/2003 | Diening | |
| 6,950,586 B2 | 9/2005 | Po | |
| 7,116,887 B2 | 10/2006 | Farroni | |
| 7,215,858 B2 | 5/2007 | Po | |
| 2003/0202547 A1 * | 10/2003 | Fermann et al. | 372/6 |
| 2005/0226580 A1 | 10/2005 | Samson | |
| 2007/0077004 A1 * | 4/2007 | DiGiovanni et al. | 385/28 |

FOREIGN PATENT DOCUMENTS

| | | |
|---|---|---|
| EP | 0898348 A1 | 2/1999 |
| EP | 0689068 B1 | 5/2002 |
| EP | 1095432 B1 | 9/2003 |
| WO | 97/35220 | 9/1997 |
| WO | 02/071554 A3 | 9/2002 |
| WO | 02/079829 A1 | 10/2002 |

OTHER PUBLICATIONS

Dawson et al.; "Large flattened mode optical fiber for high output energy pulsed fiber lasers"; CLEO Jun. 3, 2003 3.30-3.45, CWD5.

Optoelectronics Research Centre; "High power fiber lasers : pulsed fiber devices"; www.orc.soton.ac.uk/hpfl/pulsed.php, printed Mar. 30, 2005.

Vienne et al.; "Fabrication and Characterization of Yb3+:Er3+ Phosphosilicate Fibers for Lasers"; Journal of Lightwave Technology, vol. 16, No. 11, pp. 1990-2001 (Nov. 1998).

Nilsson et al.; "Yb3+ -ring-doped fiber for high-energy pulse amplification"; Optics Letters, vol. 22, No. 14, pp. 1092-1095 (Jul. 15, 1997).

Nilsson et al.; "Ring-doped cladding-pumped single-mode three-level fiber laser"; Optics Letters, vol. 23, No. 5, pp. 355-357 (Mar. 1, 1998).

Alvarez-Chavez et al.; "High-energy, high-power ytterbium-doped Q-switched fiber laser"; Optics Letters, vol. 25, No. 1, pp. 37-39 (Jan. 1, 2000).

Supplementary European Search Report for Application EP 02757827, completion date Jan. 31, 2005.

Claim Amendments Filed Mar. 28, 2005 with Response to Office Action mailed by Examiner on Sep. 27, 2004 in U.S. Appl. No. 10/653,435, now patent No. 6,950,586.

* cited by examiner

RING CORE FIBER

CROSS-REFERENCE TO RELATED APPLICATIONS

The present application is a continuation of application Ser. No. 10/675,350, filed Sep. 30, 2003 and entitled "Ring Core Fiber", which issued as U.S. Pat. No. 7,215,858 on May 8, 2007. Application Ser. No. 10/675,350 is a continuation-in part of International Application No. PCT/US02/09513, which has an international filing date of Mar. 27, 2002, and is entitled "Ring Core Fiber", and which in turn claims priority to U.S. Provisional Patent Application Ser. No. 60/280,033, which was filed Mar. 30, 2001 and is also entitled "Ring Core Fiber". The foregoing applications are incorporated herein by reference.

FIELD OF THE INVENTION

The invention relates to optical waveguides, such as, for example, optical fibers, and to amplifiers and lasers that include optical waveguides, such as for example, fiber lasers and fiber amplifiers, and to systems including such amplifiers and lasers.

BACKGROUND

Fibers, such as fiber lasers and fiber amplifiers, can be used to enhance absorption of pump energy. One type of fiber, commonly referred to as a double clad fiber, includes a core, a first cladding around the core and a second cladding around the first cladding. The core can comprise a rare earth material. The first cladding can be capable of receiving pump energy for absorption by the rare earth material. The second cladding can tend to prevent the pump energy from escaping the first cladding.

SUMMARY

The invention typically relates to optical fibers, fiber lasers and fiber amplifiers, and to systems including such fibers and fiber devices.

In one aspect, the invention features a fiber (e.g., a multimode fiber) that includes a first region, a core and a cladding. The core surrounds the first region, and the cladding surrounds the core. Typically, the core includes an active material, such as, for example, a selected rare earth material.

In a further aspect, the invention features a system that includes two fibers. One of the fibers has a first region, a first core (e.g., a multimode core) surrounding the first region, and a cladding surrounding the core. The other fiber has a core (e.g., a single mode core). The fibers are in optical communication (connected) such that energy can propagate from the core of one fiber to the core of the other fiber. Typically, at least one of the cores includes an active material.

Embodiments of the invention can include one or more of the following features.

The core can be ring-shaped.

The core can be a multimode core.

The core can include a rare earth-doped material.

The core can include a silica material and ions of a rare earth metal.

The first region can include a silica material.

The first region can have a lower index of refraction than the core.

The first cladding can include a silica material.

The first cladding can have a lower index of refraction than the core.

The fiber can further include a second cladding surrounding the first cladding.

The second cladding can be formed of a polymer material.

The index of refraction of the first cladding can be greater than the index of refraction of the second cladding.

The fiber can be a multimode fiber.

The system can include one or more additional fibers. Each of the additional fiber(s) can individually be a single mode fiber or a multimode fiber. The core of each of the additional fiber(s) can individually be in optical communication with the first core so that energy can propagate from the core to the particular additional fiber, or, alternatively or additionally, from the particular fiber to the core. The particular additional fiber can be connected to the fiber, such as by being spliced to the fiber. A lens or system of lenses can be used for optical communication.

The system can further include an energy source.

The system can further include a coupler configured to couple energy emitted by the energy source to the core.

In certain embodiments, the fiber provides the advantage of being a multimode fiber. This can be advantageous, for example, when it is desirable to propagate a relatively high amount of energy through a relatively small amount of space.

In some embodiments, the fiber is designed to be scalable. For example, the fiber can be designed so that, as its length is increased, the amount of energy (power) that can be propagated by the fiber increases (e.g., increases approximately linearly).

In some embodiments, the fiber can be designed to have a core capable of absorbing a relatively large amount of energy per unit length of fiber. In some embodiments, relative to other fibers having the same total cross-section, the fiber of the invention can have increased pump energy absorption.

In certain embodiments, the fiber can be designed to have a relatively large effective cross-sectional area. In some embodiments, this can reduce undesirable nonlinear effects.

In some embodiments, the fiber can be designed to be used in a side pump configuration and/or an end pump configuration.

In certain embodiments, a fiber can be relatively easily manufactured.

In some embodiments, a fiber can exhibit enhanced absorption. In certain embodiments, this can result from a fiber having a relatively large effective area.

In some embodiments, a fiber can exhibit relatively high stability. In certain embodiments, this can result from a fiber having a relatively short cavity length.

In some embodiments, a fiber can exhibit relatively few non-linear effects. In certain embodiments, this can result from a fiber having a relatively low power density.

In some embodiments, systems can be relatively easily developed by adding more sections. In certain embodiments, this can result from the relatively easy power scaling properties of a fiber.

Features, objects and advantages of the invention are in the summary, description, drawings and claims.

DETAILED DESCRIPTION

Figure 1:
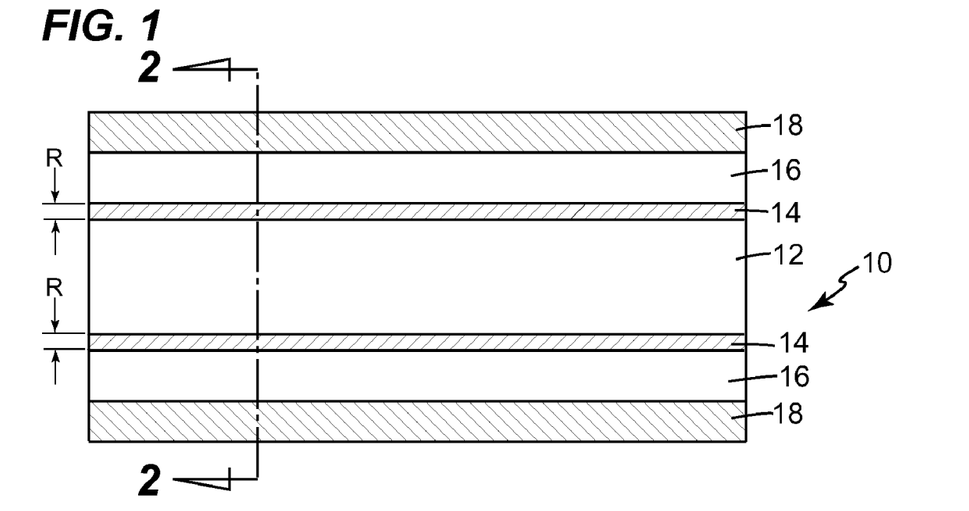
FIG. 1 is a cross-sectional view of an embodiment of a fiber.
Figure 2A:
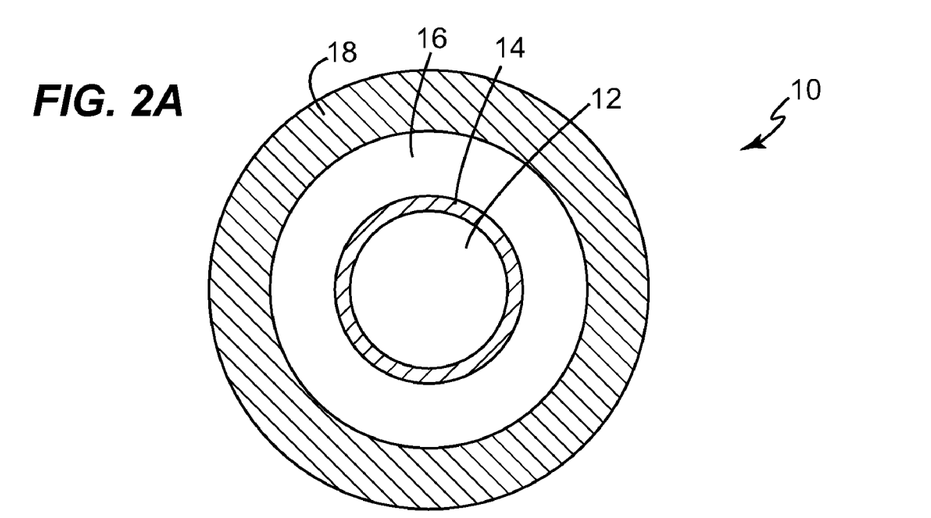
FIG. 2A is a cross-sectional view of the fiber of FIG. 1.

FIGS. 1 and 2A show cross-sectional views of an embodiment of a fiber 10 having a first region 12, a ring-shaped core 14, a first cladding 16 and a second cladding 18.

Typically, core 14 includes a first material (e.g., a silica material, such as a fused silica) and at least one dopant (e.g., at least one rare earth ion, such as, for example, erbium ions, ytterbium ions, neodymium ions, holmium ions, dysprosium ions and/or thulium ions; and/or transition metal ion(s)) where the rare earths are understood to include elements 57-71 of the periodic table. More generally, however, core 14 can be formed of any material (e.g., active material) or combination of materials (e.g., active materials) capable of interacting with a pump signal to enhance pump signal absorption (e.g., produce gain). In certain embodiments, core 14 is formed of fused silica doped with erbium ions. As is well understood by one of ordinary skill in the art, active materials, such as the rare earths, provide energy of a first wavelength responsive to receiving energy (typically referred to as "pump" energy) of a second wavelength that is different than the first wavelength.

Core 14 can optionally include certain other materials. For example, core 14 can include one or more materials to increase the index of refraction. Such materials include, for example, germanium oxide. Core 14 can include one or more materials to decrease the index of refraction. Such materials include, for example, boron oxide. Core 14 can include one or more materials (e.g., aluminum oxide) that enhance the solubility of the rare earth ion(s) within core 14 (e.g., within silica, such as fused silica). Core 14 can include one or more materials that enhance the homogeneity of the index of refraction within core 14. An example of such a material is phosphorus pentoxide.

Generally, core 14 is designed to support multimode energy propagation. The thickness R of core 14 can vary depending upon the intended use of fiber 10. In certain embodiments, the thickness R of core 14 is less than about 15 microns (e.g., less than about 10 microns, less than about nine microns, less than about eight microns, less than about seven microns, less than about six microns, less than about five microns). In some embodiments, the thickness R of core 14 is at least about one micron (e.g., at least about two microns, at least about three microns, at least about four microns). In certain embodiments, the thickness R of core 14 is from about four microns to about five microns.

Region 12 is usually formed of a material having a lower refractive index than core 14. In some embodiments, core 14 has a refractive index ($n_{14}$) and region 12 has a refractive index ($n_{12}$) so that $((n_{14})^2-(n_{12})^2)^{1/2}$ is less than about 0.2 (e.g., less than about 0.17) and greater than about 0.05 (e.g., greater than about 0.12), such as from about 0.12 to about 0.17. Examples of materials from which region 12 can be formed include silica materials, such as fused silica materials.

In certain embodiments, the refractive index of region 12 is about the same (e.g., the same) as the refractive index of core 14.

Cladding 16 usually comprises a lower refractive index than core 14. In some embodiments, core 14 has a refractive index ($n_{14}$) and cladding 16 has a refractive index ($n_{16}$) so that $((n_{14})^2-(n_{16})^2)^{1/2}$ is less than about 0.2 (e.g., less than about 0.17) and greater than about 0.05 (e.g., greater than about 0.12), such as from about 0.12 to about 0.17. Examples of materials from which cladding 16 can be formed include silica materials, such as fused silica materials. In some embodiments, region 12 and cladding 16 are formed of the same material(s). In certain embodiments, region 12 and cladding 16 are formed of different material(s).

Cladding 18 usually comprises a lower refractive index than an index of refraction comprised by cladding 16. In some embodiments, claddings 18 and 16 have refractive indices ($n_{18}$) and ($n_{16}$), respectively, so that $((n_{16})^2-(n_{18})^2)^{1/2}$ is less than about 0.6 (e.g., less than about 0.5) and greater than about 0.3 (e.g., greater than about 0.4), such as from about 0.42 to about 0.47. Examples of materials from which cladding 18 can be formed include polymeric materials, such as, for example, acrylate resins, silicone polymers, polyurethane. Such materials can be, for example, fluorinated or nonfluorinated. Cladding 16 and 18 can also comprise microstructured-type claddings, and can, for example, comprise voids or air or another gas. Microstructured claddings, as is well known in the art, can comprise photonic bandgap structures or structures that achieve a selected average index of refraction, such as by, for example, incorporating gaps or voids.

Figure 2B:
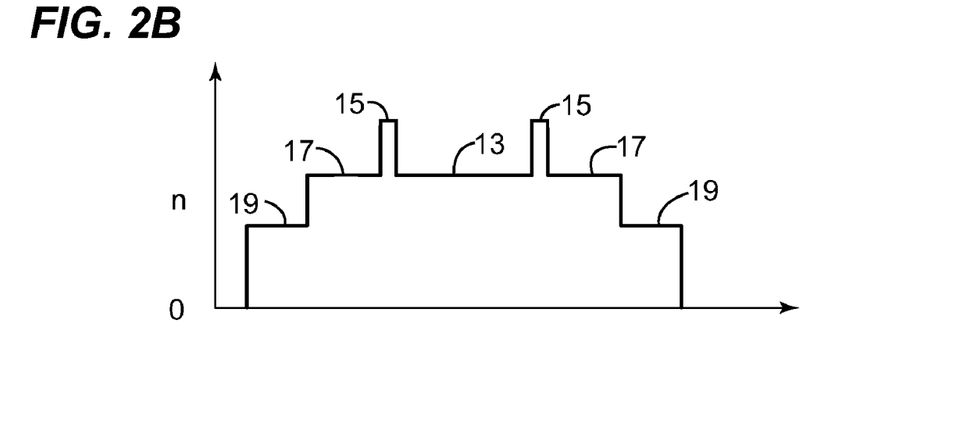
FIG. 2B is an index profile of the fiber of FIGS. 1 and 2A.

FIG. 2B is a refractive index profile of fiber 10 in an embodiment in which section 13 of the refractive index profile corresponds generally to the region 12; sections 15 correspond generally to the core 14; sections 17 correspond generally to the first cladding 16; and sections 19 correspond generally to the second cladding 18. In the embodiment shown, the refractive index of core 14 is greater than the refractive indices of region 12, cladding 16 and cladding 18; the refractive index of region 12 is about the same as the refractive index of cladding 16; and the refractive index of cladding 18 is less than the refractive index of region 12 and the refractive index of cladding 16. Typically, but not necessarily, one or more of the region 12, the core 14 and the cladding 16 and 18 each comprise a single refractive index that is substantially constant.

Figure 3:
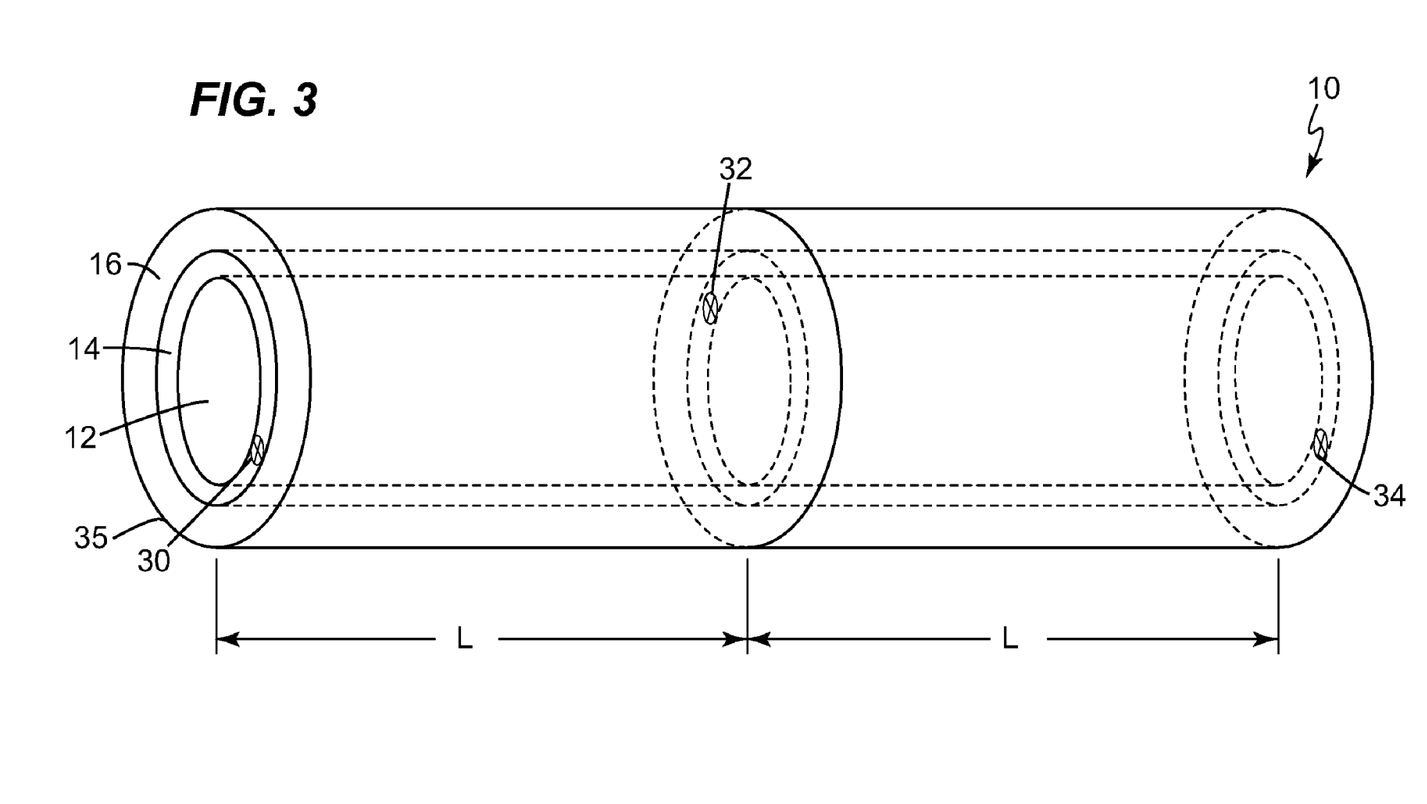
FIG. 3 is a perspective view of an embodiment of a fiber.

FIG. 3 illustrates the manner in which energy can propagate along fiber 10 (cladding 18 not shown). Energy focused at a point 30 on core 14 is focused at its mirror image point 32 on core 14 after propagating along core 14 for a distance L. After the energy propagates along core 14 another distance L, the energy is focused at a point 34 of core 14, which is the self image of point 30 on core 14. It is therefore possible to use fiber 10 for relatively high power transmission via fiber 10. This can be advantageous, for example, when it is desirable to use a relatively short length of fiber to transmit a relatively high power (e.g., when decreasing the length of fiber results in more stable and/or higher quality signal transmission).

Without wishing to be bound by theory, it is believed that this behavior can be explained through multimode interference phenomena as follows. An arbitrary energy distribution A(r, θ) in the object plane of an endface 35 of fiber 10 can be represented as a superposition of all waveguide modes:

$$A(r,\theta)=\Sigma a_m F_m(r,\theta)$$

where $a_m$ are the complex amplitude coefficients (time factor $e^{-i\omega t}$ omitted). After propagating through a distance z, the energy distribution becomes:

$$B(r,\theta)=e^{i\beta_0 z}\Sigma a_m F_m(r,\theta)e^{i\phi_m}$$

where $\phi_m=(b_m-b_0)z$ is the phase difference between the $m^{th}$ and fundamental mode (m=0). A good approximation yields:

$$\phi_m \approx \pi m^2 z L_1 = -\pi m^2 h$$

where $L_1=(N2\pi R)/\lambda$ is the effective index of the equivalent planar waveguide to fiber 10.

At a distance z=L(h=1), then $B(r, \theta)=A(r, \theta+\pi)$, which is the mirror image signal. The simplest multiple image is at h=½, where $B(r, \theta)=((1-i)/2)A(r, \theta)+((1+i)/2)A(r, \theta+\pi)$, which corresponds to the self image signal. Higher order signals can be formed in an analogous way.

Figure 4:
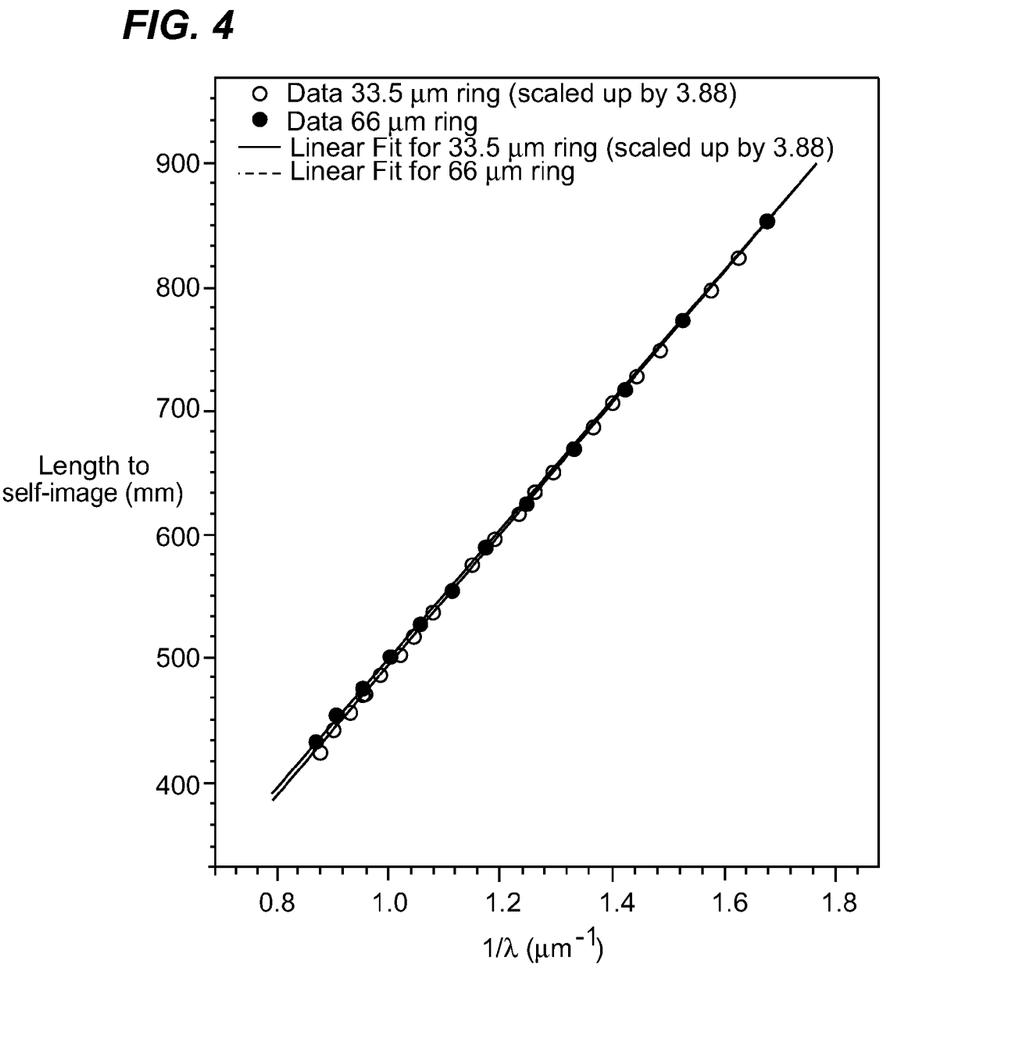
FIG. 4 is a graph of the self-image length as a function of inverse wavelength for an embodiment of a fiber.

FIG. 4 is a graph of calculated values using the above equations for the self image length as a function of the inverse of wavelength of the energy (e.g., light) for a double clad fiber as shown in FIGS. 1 and 2A with a core radius of 33.5μ and a core radius of 66μ (calculations assume no change in refractive index caused by the pump energy). The data for a core radius of 33.5μ is scaled by a factor of 3.88, which is the square of the ratio of the radii (i.e. $(66/33.5)^2$). FIG. 4 shows that, for a given ring core radius, the self image length is substantially directly proportional to the inverse of the wavelength of the energy (the data for 33.5μ ring core radius had an R value of 0.9999, and the data for the 66μ ring core radius had an R value of 0.99998). FIG. 4 also shows that, for a given wavelength of energy, the self image length scales as the square of the ring core radius.

With this information, the ring core radius, wavelength of energy and/or self image length for a double clad fiber as shown in FIGS. 1 and 2A can be manipulated in a relatively predictable fashion. Generally, if the self-image length for such a fiber is known at a given wavelength of energy and ring core radius, one of these parameters can be varied in a predictable fashion when the other two variables are kept constant. As an example, if the self image length for such a fiber is known at a given wavelength of energy and ring core radius, the appropriate self image length can be determined a priori when the ring core radius is varied and the wavelength of energy is kept constant. As another example, if the self image length for such a fiber is known at a given wavelength of energy and ring core radius, the appropriate wavelength of energy can be determined a priori when the self image length is varied and the ring core radius is kept constant. As a further example, if the self image length for such a fiber is known at a given wavelength of energy and ring core radius, the appropriate ring core radius can be determined a priori when the wavelength of energy is varied and the self image length is kept constant. Other examples will be apparent to those skilled in the art.

Figure 5:
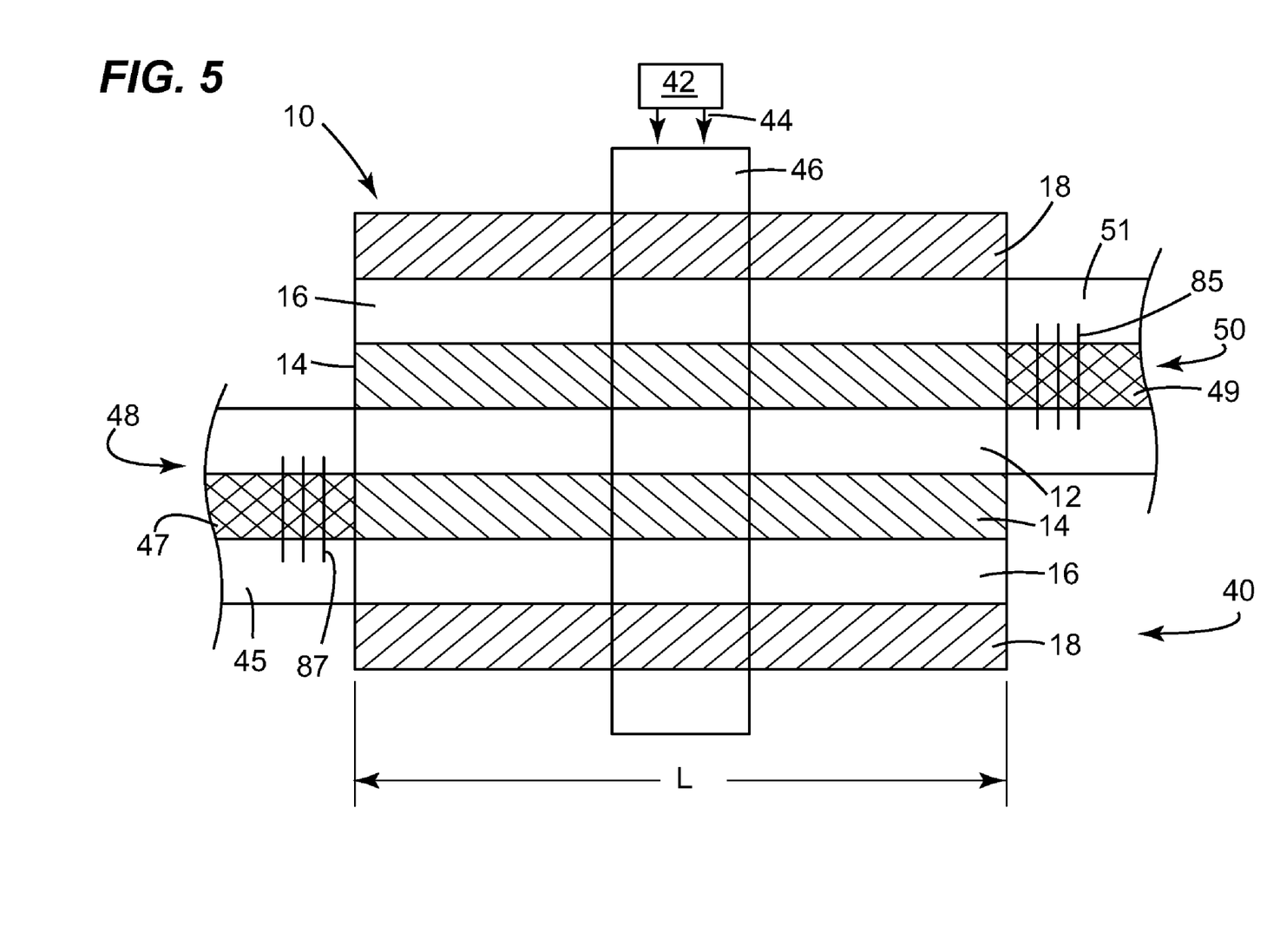
FIG. 5 is a cross-sectional view of an embodiment of a system including a fiber.

FIG. 5 shows a fiber laser system 40 in which fiber 10 is used as a gain medium. An energy source 42 emits a pump signal 44 which is coupled to fiber 10 via a coupler 46 (e.g., a V-shaped groove, such as a 90° V-shaped groove, cut into claddings 16 and 18 on the side of fiber 10; a removed portion of cladding 18 that is replaced with a prism having substantially the same refractive index as cladding 16; a removed portion of cladding 18 that is replaced with a coupling window; or the like).

A single mode fiber 48 having a core 47, a cladding 45 and a reflective element 87 (e.g., a grating) optically communicates with at least (or only) a part of the cross section of the core 14 at one end of fiber 10, as indicated by FIG. 5. Core 47 is connected to core 14 in FIG. 5. A single mode fiber 50 having a core 49, a cladding 51 and a reflective element 85 (e.g., a grating) optically communicates with the core 14 at a different end of fiber 10 so that core 49 is connected to core 14. Fiber 48 can be a passive single mode fiber or an active single mode fiber, and fiber 50 can be a passive single mode fiber or an active single mode fiber. Typically, in embodiments in which fibers 48 and 50 are passive single mode fibers, cores 47 and 49 are formed of silica (e.g., fused silica) and one or more materials (e.g., germanium), and claddings 45 and 51 are formed of silica (e.g., fused silica). Examples of single mode fibers are known to those skilled in the art and are contemplated. Generally, in embodiments in which fibers 48 and 50 are active single mode fibers, cores 47 and 49 are formed of silica (e.g., fused silica) and an active material, and claddings 45 and 51 are formed of silica (e.g., fused silica). Examples of active single mode fibers are disclosed, for example, in "Rare Earth Doped Fiber Lasers and Amplifiers", edited by Michael J. F. Digonnet (1993), which is hereby incorporated by reference.

Typically, the dimensions of fibers 48 and 50 are selected so that there is good mode matching between core 14 and cores 47 and 49. In some embodiments, this can be achieved by selecting cores 47 and 49 to have a diameter that is substantially the same size as a thickness of the core 14, as shown in FIG. 5.

Fiber 10 can have a length L so that the respective positions at which the single mode cores of fibers 48 and 50 are connected to core 14 are diametrically opposed (mirror image). Fibers 48 and 50 have elements 87 and 85, respectively. Elements 87 and 85 are designed to reflect energy at a desired wavelength ($\lambda_{out}$). Cores 14, 47 and 49 include one or more materials (e.g., active material(s)) that interact(s) with the pump signal so that elements 87 and 85 provide a lasing cavity for energy at $\lambda_{out}$ and fiber 10 acts as a gain medium for energy at $\lambda_{out}$. In certain embodiments, the reflectance (e.g., less than 100%) of element 87 for energy at $\lambda_{out}$ is substantially less than the reflectance (e.g., about 100%) of element 85 for energy at $\lambda_{out}$ so that a portion of the energy at $\lambda_{out}$ passes through element 85. While shown in FIG. 5 as having a length L, fiber 10 in system 40 can more generally have any odd integer length of L (e.g., 3L, 5L, 7L, 9L, 11L, etc.) while maintaining the relative positions of fibers 48 and 50 unchanged (e.g., diametrically opposed).

Figure 6:
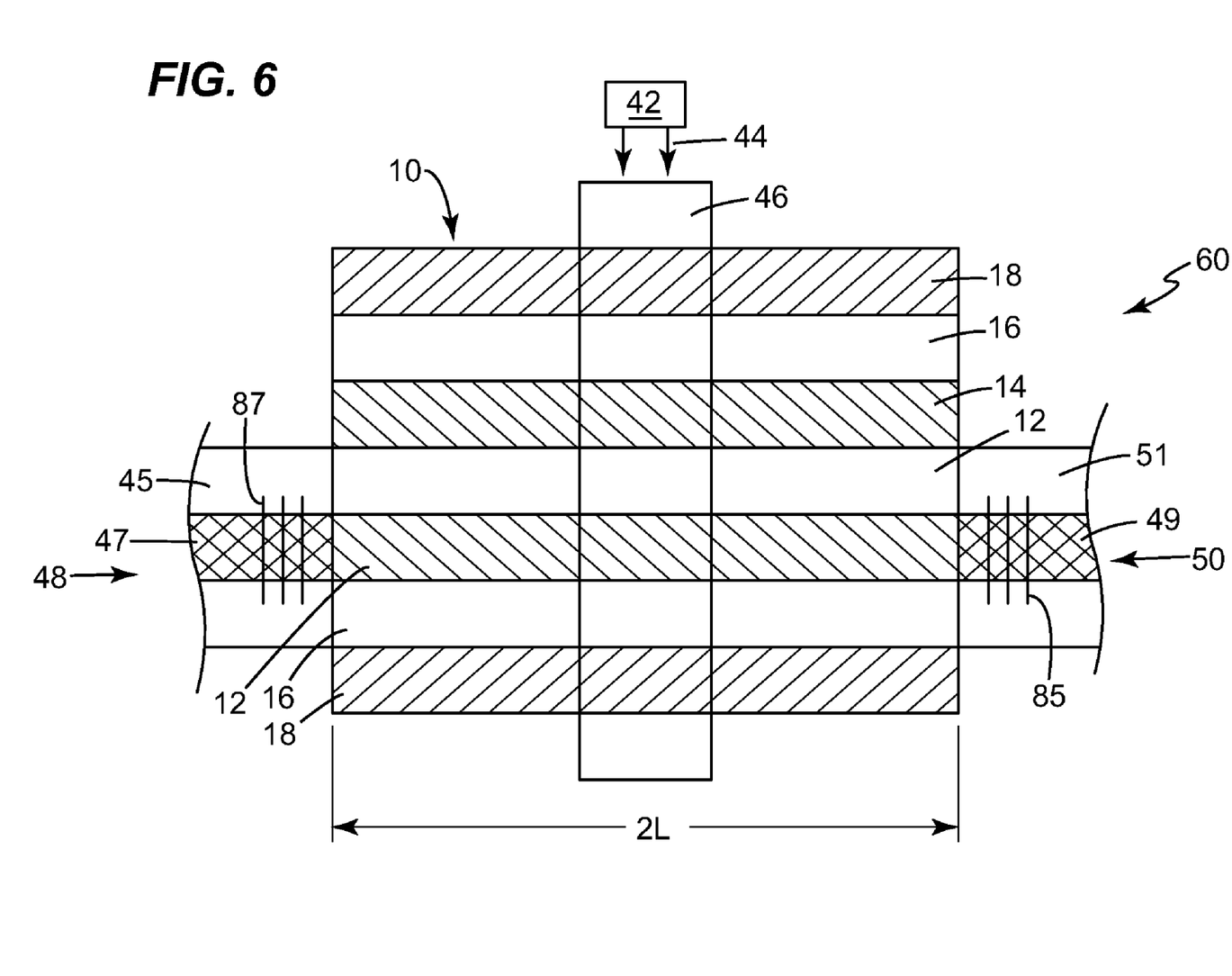
FIG. 6 is a cross-sectional view of an embodiment of a system including a fiber.

FIG. 6 shows a fiber laser system 60 in which fiber 10 is used as a gain medium and has a length 2L. In this embodiment, the respective positions at which the single mode cores of fibers 48 and 50 are connected to core 14 are a self image. While shown in FIG. 6 as having a length 2L, fiber 10 in system 60 can more generally have any even integer length of 2L (e.g., 4L, 6L, 8L, 10L, etc.) while maintaining the relative positions of fibers 48 and 50 unchanged (e.g., self image configuration).

Figure 7:
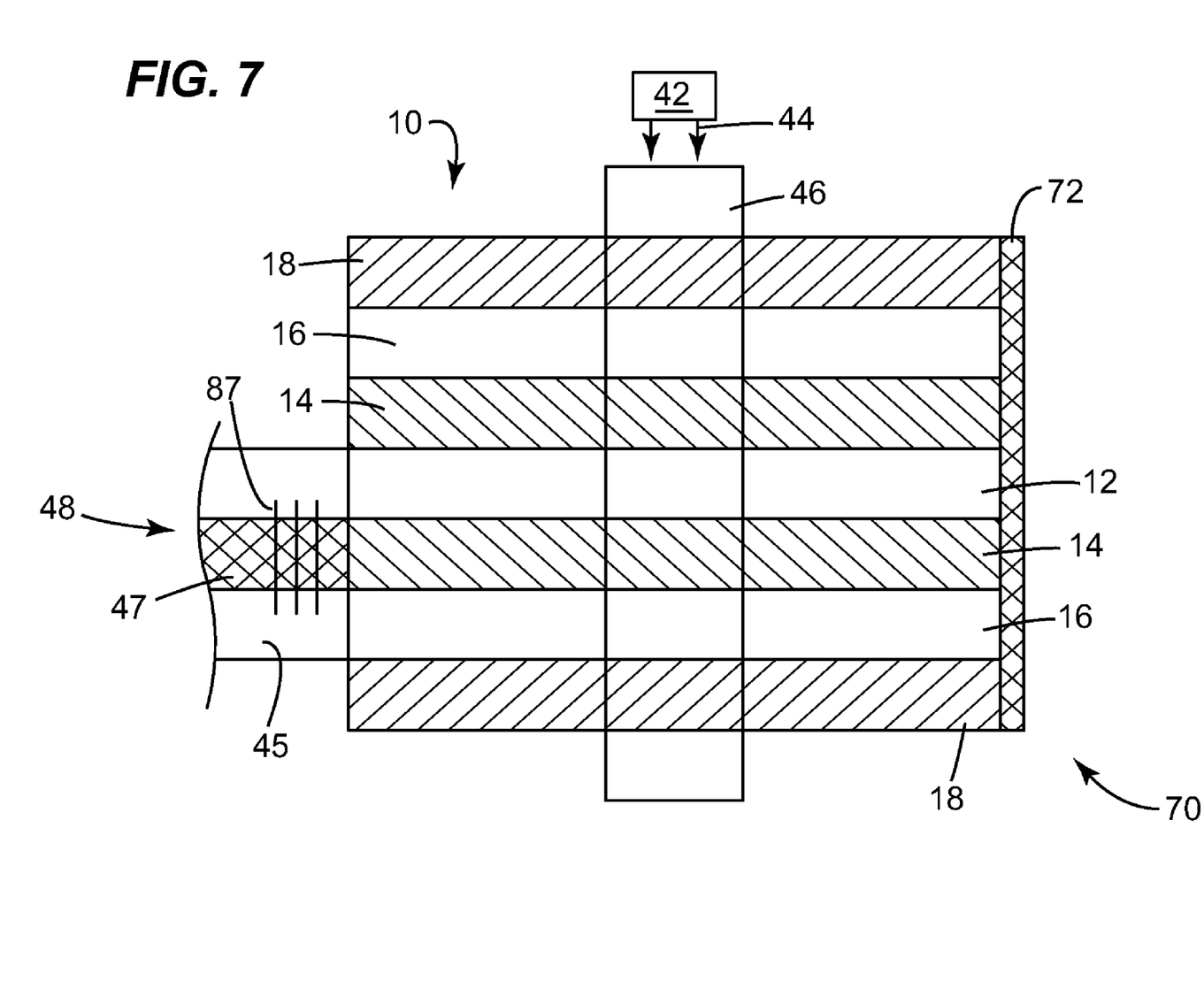
FIG. 7 is a cross-sectional view of an embodiment of a system including a fiber.

FIG. 7 shows a fiber system 70 in which fiber 10 is used as a gain medium. The core of single mode fiber 48 optically communicates with (is connected to) core 14 at one end of fiber 10, and the other end of fiber 10 is coated with a reflective material 72 (e.g., a mirror, such as a broad band mirror) so that element 87 and mirror 72 provide a lasing cavity for energy $\lambda_{out}$ and fiber 10 acts as a gain medium for energy at $\lambda_{out}$. In these embodiments, mirror 72 can reflect substantially all (e.g., about 100%) of the energy at $\lambda_{out}$, and element 87 can reflect less (e.g., less than about 100%) of the energy at $\lambda_{out}$ so that a portion of the energy at $\lambda_{out}$ passes through element 87. In these embodiments, fiber 10 can have a length that is an integer number of L (e.g., L, 2L, 3L, 4L, 5L, 6L, etc.), or fiber 10 can have a length that is not an integer number of L.

While FIGS. 5-7 show certain embodiments of fiber 10 in a fiber laser system, other arrangements will be apparent to those skilled in the art. For example, fiber 10 can be used in fiber amplifier systems and/or systems that include both fiber lasers and fiber amplifiers. Examples of fiber laser systems and fiber amplifier systems in which fiber 10 can be used are disclosed, for example, in commonly owned U.S. Provisional Patent Application Ser. No. 60/267,252 filed on Feb. 7, 2001, and entitled "Raman Fiber Laser" and in commonly owned U.S. patent application Ser. No. 09/798,148, filed on Mar. 2, 2001, and entitled "Fiber For Enhanced Energy Absorption" (now issued as U.S. Pat. No. 6,516,124 on Feb. 4, 2003), both of which are incorporated by reference herein.

Figure 8:
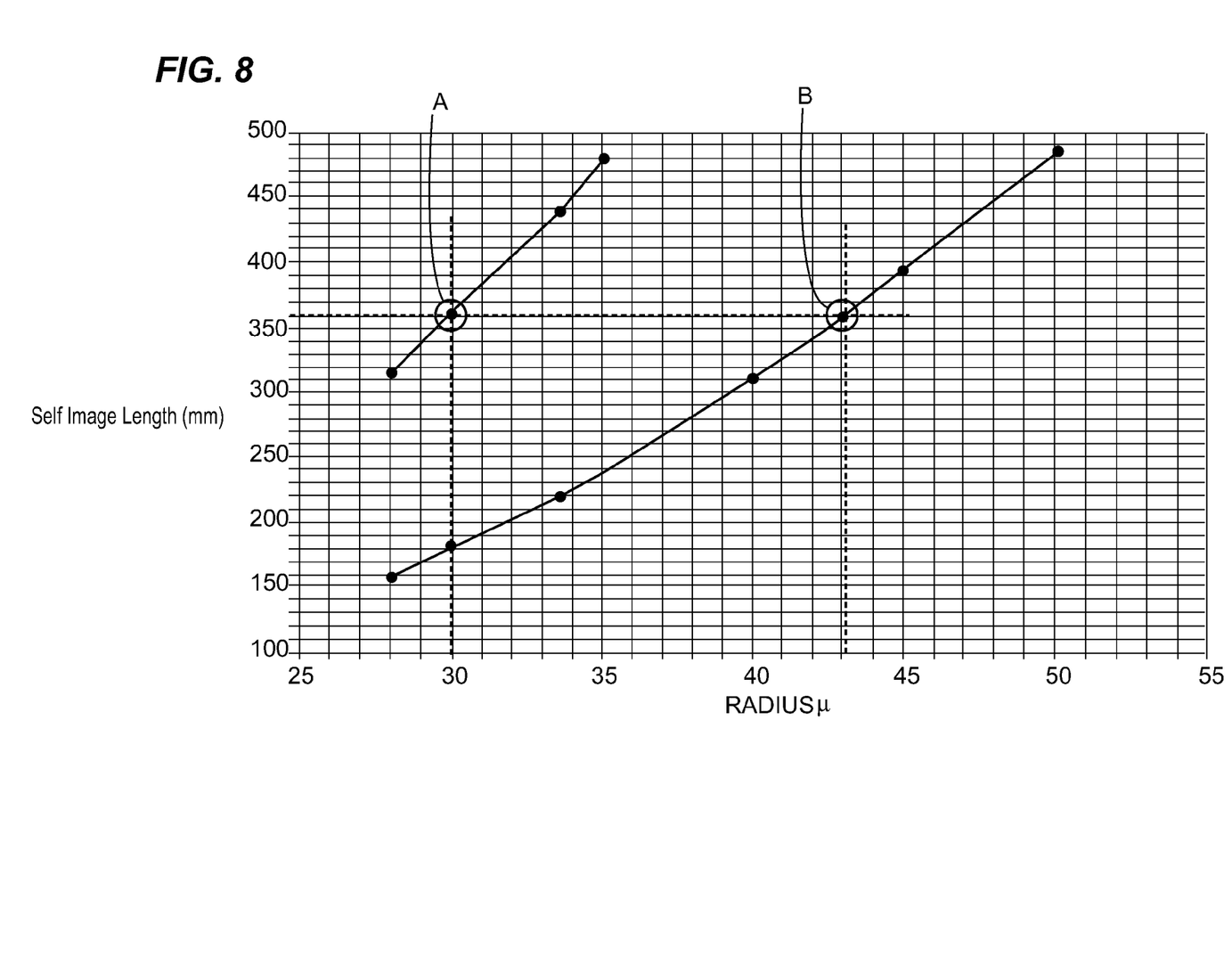
FIG. 8 is a graph of the self image length and double self image length as a function of radius for an embodiment of a fiber.

While certain embodiments of the invention have been disclosed herein, the invention is not limited to these embodiments. For example, in certain embodiments, the fiber 10 can have any design appropriate to support multimode energy propagation. For example, fiber 10 can include multiple ring-shaped cores. It may be desirable in such embodiments for the length of fiber 10 to be selected so that it matches the self image lengths or integer multiples thereof for the ring-shaped cores. Using the above equations, the length of fiber 10 can be calculated a priori to achieve this goal. An example of such a calculation is as follows. FIG. 8 shows a graph of the first self image length (lower curve) and second self image length (upper curve) as a function of the ring core radius for a double clad fiber having a ring core radius containing active material. With this information, for example, the appropriate length of a fiber having two concentric ring cores containing active material can be determined so that the length of the fiber corresponds to twice the self image length of the inner core and the self image length of the outer core, resulting in both the inner and outer rings of the fiber being capable of being used as a gain medium. This can be achieved, for example, as follows. A radius for the inner ring is selected, and its double self image length is determined based upon the point (point A) on the upper graph in FIG. 8 that has the same radius. A radius for the outer ring is then determined based upon the point (point B) on the lower graph in FIG. 8 that has the same self image length as point A. Other techniques of selecting appropriate fiber lengths for a given number of ring cores will be apparent to those skilled in the art.

The shapes and sizes of the elements of fiber 10 can also be varied as desired. Examples of certain appropriate fiber designs, shapes and sizes are disclosed, for example, in commonly owned U.S. patent application Ser. No. 09/798,148, filed on Mar. 2, 2001, and entitled "Fiber For Enhanced Energy Absorption" (now issued as U.S. Pat. No. 6,516,124 on Feb. 4, 2003). In addition, while systems using side pumping have been described, such as in FIGS. 5-7, other systems can also be used. As an example, systems using end pumping can be used. As another example, systems using both end pumping and side pumping can be used. As yet a further example, FIGS. 5-7 illustrate optical fibers, such as, for example, optical fibers 10 and 48, that optically communicate. As is understood by one of ordinary skill in the art, an optical connection can include a lens or lenses for conditioning light received from the core of one fiber and providing that light to the core of the other fiber.

Furthermore, while systems having one or two single mode fibers have been described, the invention is not limited in this sense. Additional single mode fibers (e.g., passive single mode fibers) can be used (e.g., three single mode fibers, four single mode fibers, five single mode fibers, six single mode fibers, seven single mode fibers, eight single mode fibers, nine single mode fibers, 10 single mode fibers, 11 single mode fibers, 12 single mode fibers, etc.) following the general principles discussed herein.

Other embodiments are in the claims.

What is claimed is:

1. A method of producing higher power optical energy using an optical fiber by reducing non-linear effects, comprising:
   propagating with the core of a first optical fiber optical energy having a selected wavelength, the core being single mode at the selected wavelength;
   communicating the optical energy having the selected wavelength from the core of the first length of optical fiber to a second length of optical fiber that comprises an active material for providing gain at the selected wavelength and that can support multiple modes at the selected wavelength, the optical energy so communicated propagating in the second length of fiber in at least one higher order mode and at the selected wavelength;
   optically pumping the active material of the second length of optical fiber such that the optical energy experiences gain while propagating in the at least one higher order mode;
   communicating the optical energy that has experienced gain from the second length of optical fiber to a core of a third length of optical fiber for propagation thereby, the core being single mode at the selected wavelength; and
   wherein communicating the optical energy having the selected wavelength from the first length of optical fiber to the second length of optical fiber or communicating the optical energy that has experienced gain from the second length of optical fiber to the third length of optical fiber comprises providing an optical fiber grating.

2. The method of claim 1 wherein communicating the optical energy having the selected wavelength from the core of the first length of optical fiber to the second length of optical fiber comprises mode matching.

3. The method of claim 1 wherein communicating the optical energy that has experienced gain from the second length of optical fiber to the core of the third length of optical fiber comprises mode matching.

4. The method of claim 1 wherein communicating the optical energy having the selected wavelength from the core of the first length of optical fiber to the second length of optical fiber comprises splicing the first length of optical fiber to the second length of optical fiber.

5. The method of claim 1 wherein providing the optical fiber grating comprises providing the optical fiber grating in the first length of optical fiber for communicating the optical energy having the selected wavelength from the core of the first length of optical fiber to the second length of optical fiber.

6. The method of claim 5 wherein communicating the optical energy that has experienced gain from the second length of optical fiber to the core of the third length of optical fiber comprises providing another optical fiber grating in the third length of optical fiber.

7. The method of claim 6 wherein said optical fiber grating and the another optical fiber grating are substantially the same.

8. The method of claim 6 wherein the grating and the another grating form a laser cavity at the selected wavelength.

9. The method of claim 1 wherein the active material comprises ytterbium.

10. The method of claim 1 wherein the active material comprises erbium.

11. The method of claim 1 wherein the active material comprises thulium.

12. The method of claim 1 wherein said second length of optical fiber comprises a core comprising a refractive index, an inner cladding surrounding the core and comprising a refractive index that is less than the refractive index of the core, and a second cladding surrounding the inner cladding and having refractive index that is less than the refractive index of the inner cladding.

13. The method of claim 1 wherein the second length of optical fiber comprises a ring shaped core.

14. A method of producing higher power optical energy using an optical fiber by reducing non-linear effects, comprising:
   providing a first length of optical fiber having a core that is single mode at a selected wavelength;
   providing a second length of optical fiber constructed so as to support more than one mode of optical energy at the selected wavelength, the second length of optical waveguide comprising an active material for providing gain at the selected wavelength responsive to the second length of fiber being optically pumped;
   providing for optical communication between the second length of optical fiber and the core of the first length of optical fiber wherein optical energy from the core of the first length of optical fiber propagates in a least one higher order mode in the second length of optical fiber and experiences gain while in the higher order mode when the second length of optical fiber is optically pumped;
   providing a third length of optical fiber having a core that is single mode at the selected wavelength;
   providing for optical communication between the second length of optical fiber and the core of the third length of optical fiber wherein the optical energy that experienced the gain while in the higher order mode in the second optical fiber is propagated by the core of the of the third length of optical fiber at the selected wavelength; and
   providing a grating in the first length of optical fiber or in the second length of optical fiber.

15. The method of claim 1 wherein the second length of fiber comprises a core having a thickness of less than about 15 microns.

16. The method of claim 15 wherein the core of the second length of fiber has a thickness of less than about 10 microns.

17. The method of claim 12 wherein the refractive indices of the core, the inner cladding and the second cladding of the second length of fiber are designated, respectively, as $n_1$, $n_2$, and $n_3$, and wherein $[(n_1)^2-(n_2)^2]^{1/2}$ is less than $[(n_2)^2-(n_3)^2]^{1/2}$.

18. The method of claim 17 wherein the core of the second length of fiber has a thickness of less than about 15 microns.

19. The method of claim 18 wherein the core of the second length of fiber has a thickness of less than about 10 microns.

20. The method of claim 17 wherein $[(n_1)^2-(n_2)^2]^{1/2}$ is less than about 0.17 and greater than about 0.05 and wherein $[(n_2)^2-(n_3)^2]^{1/2}$ is less than about 0.5.

21. The method of claim 20 wherein the core of the second length of fiber has a thickness of less than about 15 microns.

22. The method of claim 21 wherein the core of the second length of fiber has a thickness of less than about 10 microns.

23. The method of claim 1 wherein the second length of fiber comprises a refractive index profile having a ring shaped region having a refractive index $n_1$ that is higher than a refractive index $n_2$ comprised by a region surrounded by the ring shaped region, and where $[(n_1)^2-(n_2)^2]^{1/2}$ is less than about 0.17 and greater than about 0.05.

24. The method of claim 23 wherein said ring shaped region has a thickness of less than about 10 microns.

25. The method of claim 24 wherein said ring shaped region has a thickness of less than about five microns.

26. The method of claim 14 wherein the first length of optical fiber comprises the grating and wherein the third length of optical fiber comprises another grating.

27. The method of claim 14 wherein the active material comprises at least one of erbium, ytterbium or thulium.

28. The method of claim 14 wherein the second length of optical fiber comprises a core having a thickness of less than about 15 microns.

29. The method of claim 14 wherein the second length of optical fiber comprises a core having a thickness of less than about 10 microns.

30. The method of claim 14 wherein the second length of optical fiber comprises a core comprising a refractive index $n_1$, an inner cladding surrounding the core and comprising a refractive index $n_2$ and a second cladding surrounding the inner cladding and having a refractive index $n_3$ and wherein $n_1 > n_2 > n_3$.

31. The method of claim 30 wherein $[(n_1)^2-(n_2)^2]^{1/2}$ is less than $[(n_2)^2-(n_3)^2]^{1/2}$.

32. The method of claim 31 wherein $[(n_1)^2-(n_2)^2]^{1/2}$ is less about 0.17 and greater than about 0.05 and wherein $[(n_2)^2-(n_3)^2]^{1/2}$ is less than about 0.5.

33. The method of claim 14 wherein said second length of optical fiber comprises a refractive index profile having a ring shaped region having a refractive index $n_1$ that is greater than a refractive index $n_2$ comprised by a region surrounded by the ring shaped region, and where $[(n_1)^2-(n_2)^2]^{1/2}$ is less than about 0.17 and greater than about 0.05.

34. Optical apparatus for producing higher power optical energy using an optical fiber by reducing non-linear effects, comprising:
   a first length of optical fiber having a core that is single mode at a selected wavelength;
   a second length of optical fiber constructed so as to support more than one mode of optical energy at the selected wavelength, the second length of optical waveguide comprising an active material for providing gain at the selected wavelength responsive to the second length of fiber being optically pumped;
   said core of said first length of optical fiber being in optical communication with said second length of optical fiber and wherein optical energy from the core of the first length of optical fiber propagates in a least one higher order mode in the second length of optical fiber and experiences gain while in the higher order mode when the second length of optical fiber is optically pumped;
   a third length of optical fiber having a core that is single mode at the selected wavelength, said second length of optical fiber being in optical communication with said core of said third length of optical fiber and wherein the optical energy that experienced the gain while in the higher order mode in the second optical fiber is propagated by the core of the of the third length of optical fiber at the selected wavelength; and
   wherein said first length of optical fiber or said second length of optical fiber comprises a grating.

35. The optical apparatus of claim 34 wherein said first length of optical fiber comprises said grating and wherein said second length of optical fiber comprises another grating.

36. The optical apparatus of claim 34 wherein said active material comprises at least one of erbium, ytterbium or thulium.

37. The optical apparatus of claim 34 wherein said second length of optical fiber comprises a core having a thickness of less than about 15 microns.

38. The optical apparatus of claim 37 wherein said core of said second length of fiber has a thickness of less than about 10 microns.

39. The optical apparatus of claim 34 wherein said second length of optical fiber comprises a core comprising a refractive index $n_1$, an inner cladding surrounding the core and comprising a refractive index $n_2$ and a second cladding surrounding the inner cladding and having a refractive index $n_3$ and wherein $n_1 > n_2 > n_3$.

40. The optical apparatus of claim 39 wherein $[(n_1)^2-(n_2)^2]^{1/2}$ is less than $[(n_2)^2-(n_3)^2]^{1/2}$.

41. The optical apparatus of claim 40 wherein $[(n_1)^2-(n_2)^2]^{1/2}$ is less about 0.17 and greater than about 0.05 and wherein $[(n_2)^2-(n_3)^2]^{1/2}$ is less than about 0.5.

42. The optical apparatus of claim 34 wherein said second length of optical fiber comprises a refractive index profile having a ring shaped region having a refractive index $n_1$ that is higher than a refractive index $n_2$ comprised by a region surrounded by the ring shaped region, and where $[(n^1)^2-(n_2)^2]^{1/2}$ is less than about 0.17 and greater than about 0.05.

\* \* \* \* \*